United States Patent [19]

Martinek

[11] Patent Number: 4,667,365

[45] Date of Patent: May 26, 1987

[54] ANTI-SHIMMY CASTER WHEEL ASSEMBLY USING A SPEED SENSOR AND BRAKING ACTION ABOUT THE VERTICLE AXIS

[75] Inventor: Norman A. Martinek, Cascade, Wis.

[73] Assignee: M-B Company, Inc. of Wisconsin, Chilton, Wis.

[21] Appl. No.: 831,829

[22] Filed: Feb. 24, 1986

[51] Int. Cl.[4] .................................................. B60B 33/00
[52] U.S. Cl. ....................................... 16/35 D; 303/100
[58] Field of Search ........................... 16/35 D, 35 R; 188/1.12, 72.4; 303/100; 244/100 R; 280/80 R, 89

[56] References Cited

U.S. PATENT DOCUMENTS

| | | | |
|---|---|---|---|
| 2,367,993 | 1/1945 | Bishop | 16/35 |
| 2,379,170 | 6/1945 | McDaniel | 280/33.4 |
| 2,656,995 | 10/1953 | Wolf | 244/103 |
| 2,770,832 | 11/1956 | Martin | 16/35 |
| 3,556,561 | 1/1971 | Gingue | 16/35 R |
| 3,800,904 | 4/1974 | Zelenka | 303/100 |
| 4,178,007 | 12/1979 | Martineau | 280/80 |
| 4,432,116 | 2/1984 | Schultz | 16/35 |
| 4,484,280 | 11/1984 | Brugger | 303/100 |

Primary Examiner—Nicholas P. Godici
Assistant Examiner—G. M. Reid
Attorney, Agent, or Firm—Quarles & Brady

[57] ABSTRACT

A caster wheel assembly which uses a mechanical brake to apply force in order to prevent shimmying at high speeds. A controller arrangement provides that no braking force is supplied until the vehicle reaches a preset speed. Thereafter, a predetermined amount of force is applied to the brakes. The predetermined force is great enough to prevent shimmying but low enough to permit the caster wheel mounting member to continue to rotate about its axis so that the vehicle may continue to be maneuvered even at high speeds.

6 Claims, 7 Drawing Figures

ANTI-SHIMMY CASTER WHEEL ASSEMBLY USING A SPEED SENSOR AND BRAKING ACTION ABOUT THE VERTICLE AXIS

BACKGROUND OF THE INVENTION

This invention relates to caster wheels, and, in particular, to a design for a caster wheel assembly which will prevent shimmying when operating a vehicle at relatively high speeds.

Caster wheels are commonly used on vehicles which operate at low speeds (10–15 m.p.h.). However, when the speed of the vehicle reaches 20 miles per hour, there is a problem of shimmying, which is an uncontrolled vibration or rotation of the caster kingpin about its axis. Various methods have been used in the past to reduce the problem of shimmying. Some designs have used hydraulic fluids and flow resisting devices in order to restrain movement of the caster wheel regardless of the speed of the vehicle. Some of these hydraulic dampers operate only at certain positions of the caster wheel and others operate for the entire 360° of rotation of the kingpin.

In the case of casters used for airplane landing wheels, it is known to provide a continuous friction force at all times (for the limited angles of operation of the caster wheel), and, upon contact of the caster wheel with the ground during landing, to mechanically lock the caster kingpin in the position which it assumes upon landing. These airplane landing wheels are not typical caster wheels, because the axis of the wheel and the axis of the caster kingpin are coplanar while, in a typical caster, the axis of the wheel always lies behind or follows the axis of the kingpin. This design means that the airplane landing wheels are not required to rotate 180° when the airplane reverses direction (unlike the typical caster wheel design). The locking of the caster kingpin prevents rotation of the kingpin entirely and would not be suitable for applications in which it is necessary to change the direction of the vehicle during operation. The limited angles of operation also would not be suitable for applications in which the caster must reverse direction, where the kingpin must be capable of rotating 360° about its axis. The constant friction which is used in many arrangements is also not desirable, because it makes maneuvering of the vehicle relatively difficult at low speeds, when there is no problem with shimmying.

SUMMARY OF THE INVENTION

The present invention broadly provides a caster wheel assembly including a support, a caster wheel mounting member rotatably mounted on the support, a rotating brake member mounted so as to rotate with the caster wheel mounting member, and a stationary brake member fixed relative to the vehicle. The caster wheel mounting member is free to rotate an entire 360°. The assembly also includes a controller for operating the brake so as to permit braking of the caster wheel mounting member at any position.

In addition the present invention includes a programmable controller which senses the speed of the vehicle and, when the speed of the vehicle is below a preset speed, provides that no braking force is applied to the caster kingpin. When the speed of the vehicle exceeds a preset speed, the controller applies a predetermined force to the brake which is sufficient to prevent shimmying.

By using the present invention, it is possible to allow free rotation of the caster wheel and caster wheel mounting member at low speeds (i.e. below 15 m.p.h.), where shimmying is not a problem, and, then, to apply friction to the brake only in the amount necessary to prevent shimmying, while, at the same time, permitting continued rotation of the caster wheel mounting member about the axis of the caster kingpin for a complete 360° so that the vehicle may continue to be maneuvered in varying directions even at relatively high speeds (up to 40 m.p.h.).

DESCRIPTION OF THE PREFERRED EMBODIMENT

Figure 1:
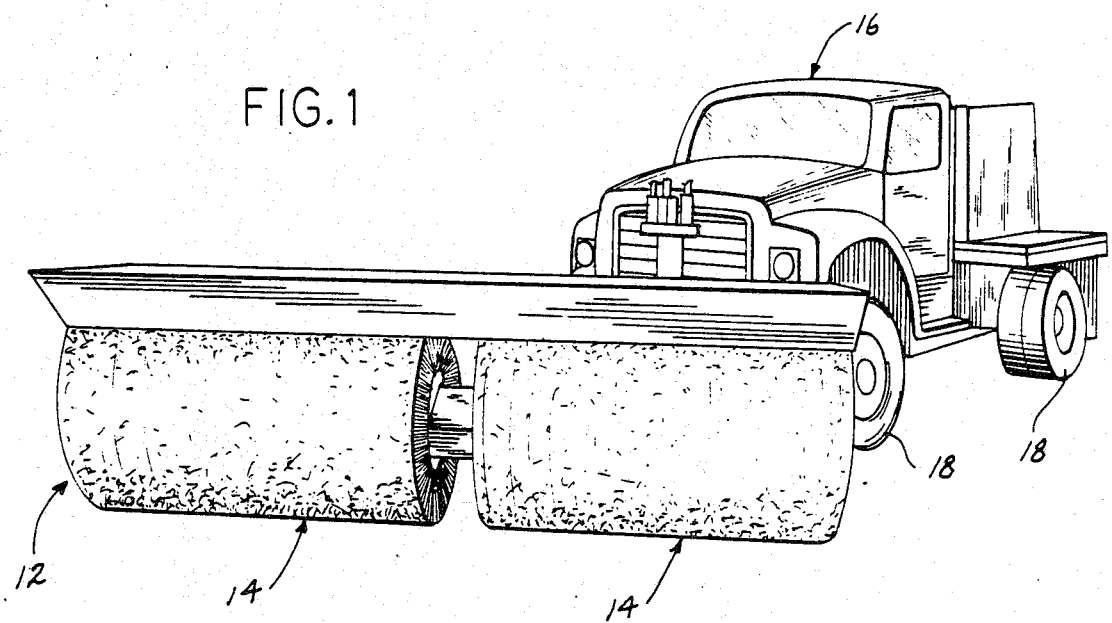
FIG. 1 is a front perspective view of a truck driving a sweeper which is supported by the caster wheel assemblies of the present invention.
Figure 2:
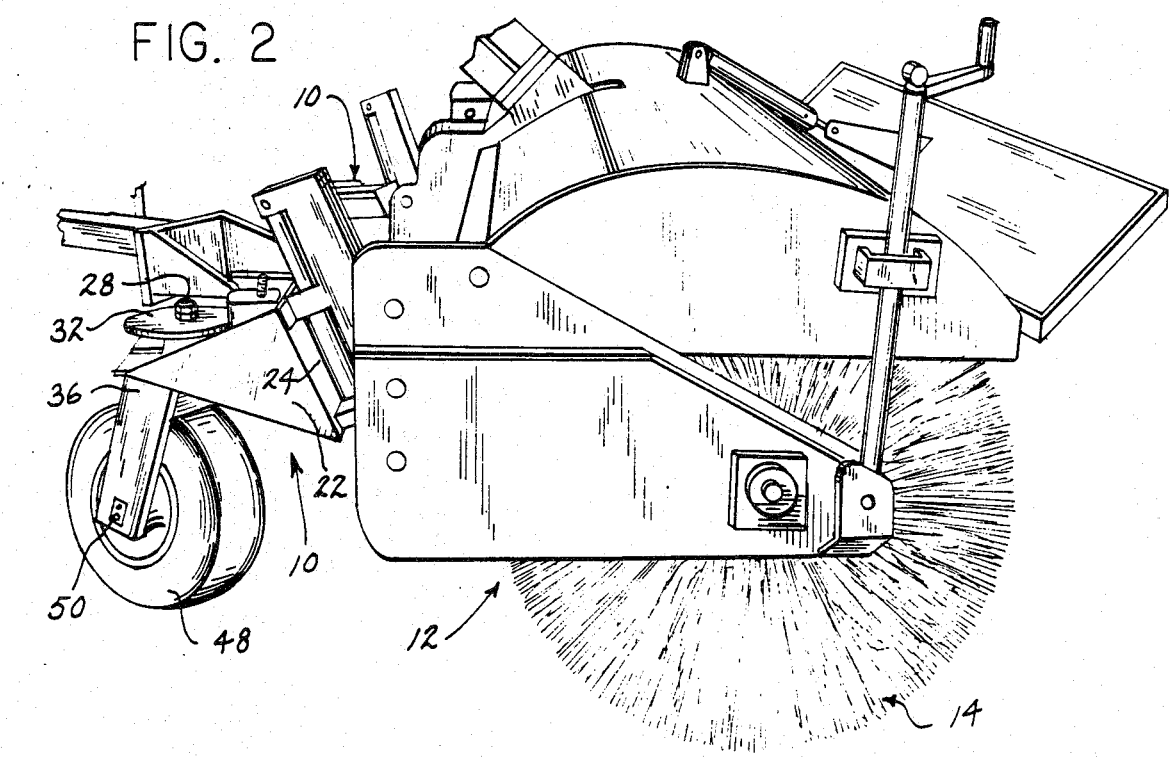
FIG. 2 is a side perspective view of the sweeper of FIG. 1, showing one of the caster wheel assemblies.

The caster wheel assembly 10 as shown in FIG. 2 is mounted on an airport sweeper 12 so as to support the weight of the sweeper 12 and broom 14. Two of the caster wheel assemblies 10 are mounted on each sweeper 12. As shown in FIG. 1, the sweeper 12 is mounted in front of the truck 16, which pushes the sweeper 12 in order to clean an airport runway. The sweeper 12 includes standard hydraulic controls (not shown) which raise and lower the broom and drive the broom so that it rotates. The truck 16 has its own wheels 18.

Looking more closely at the caster wheel assembly 10 in FIGS. 2-5, it can be seen that the assembly includes a support 22 for mounting the caster wheel assembly on a vehicle, which, in this case, is the sweeper 12. The support 22 includes a flat mounting plate 24 which has holes in it to receive bolts for mounting the support on the sweeper 12. The support 22 includes a horizontal plate 25 which is secured to a mounting plate 26 by welding, bolting, or other known means. The caster kingpin 28 is rotatably mounted on the mounting plate 26 by means of a tapered roller bearing 30 such that the caster kingpin 28 is free to rotate 360° about its substantially vertical axis. A brake rotor 32 is keyed to the caster kingpin 28 at the key 34 and is held in place by nuts 35 which are threaded on the kingpin 28. Thus, the brake rotor 32 rotates with the caster kingpin 28. On the lower end of the caster kingpin 28 is fixed a wheel fork 36, which serves as a caster wheel mounting member. The caster wheel mounting member 36 is therefore rotatably mounted on the support 22 so as to rotate about its axis (which is defined by the axis of the kingpin 28), and the brake rotor 32 is mounted so as to rotate with the caster wheel mounting member 36.

An upper seal 38 is provided between the mounting plate 26 and the spacer 40, and a lower seal 42 seals between the mounting plate 26 and the wheel fork 36. A thrust bearing 44 is also located between the mounting plate 26 and the wheel fork 36, and a grease fitting 46 is provided for lubricating the thrust bearing 44. A caster wheel 48 is mounted on a shaft 50 which defines the substantially horizontal axis of the caster wheel 48. The shaft 50 is, in turn, mounted on the wheel fork 36. The caster wheel 48 is at all times free to rotate about the shaft 50. The axis of the caster wheel 48 (which is the axis of the shaft 50) is offset from the axis of the caster wheel mounting member 36 (which is the axis of the caster kingpin 28), meaning that the two axes do not lie in the same plane. The axis of the caster wheel 48 always lies behind or follows the axis of the caster wheel mounting member 36, so that, when the vehicle reverses directions, the kingpin 28 must rotate 180°. A brake caliper 52 including brake pads 54 is bolted onto the support 22 so that the brake caliper 52 is stationary relative to the sweeper 12.

Figure 7:
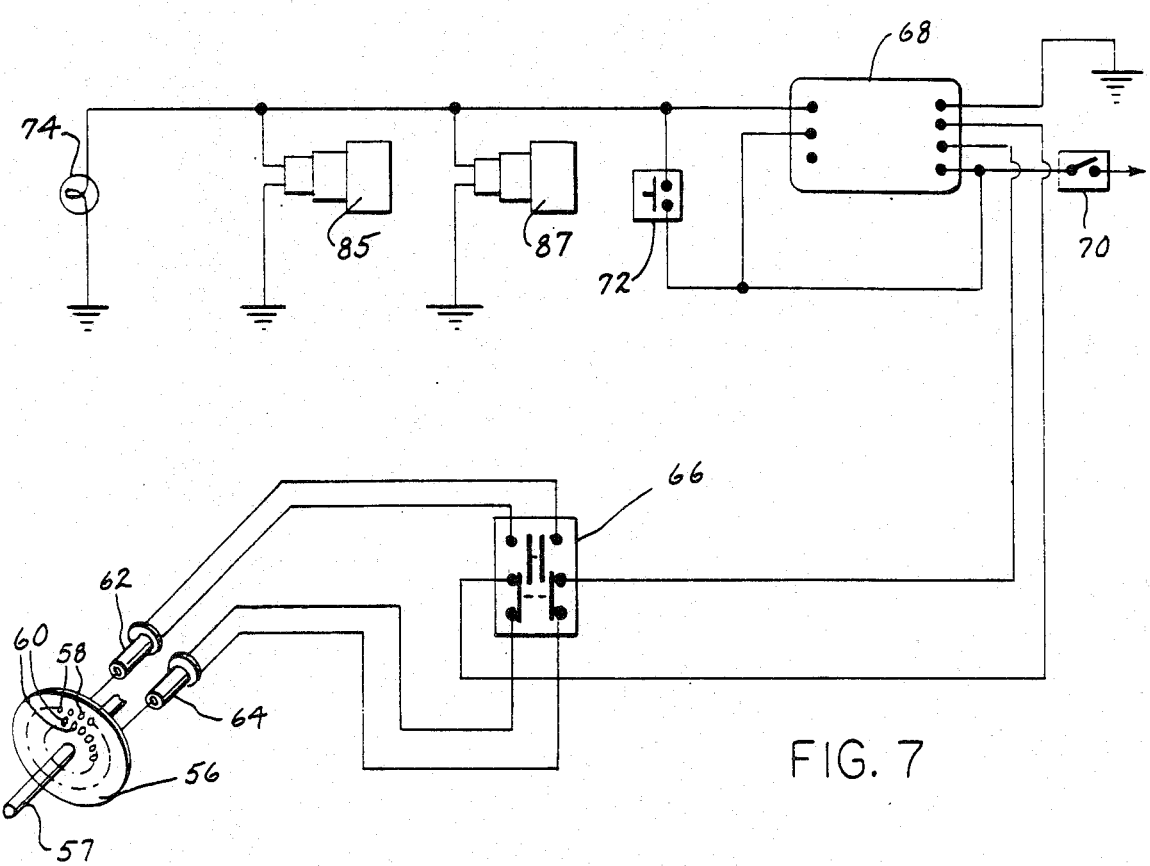
FIG. 7 is a schematic diagram showing the electrical controls for the caster wheel assembly of FIG. 2.
Figure 3:
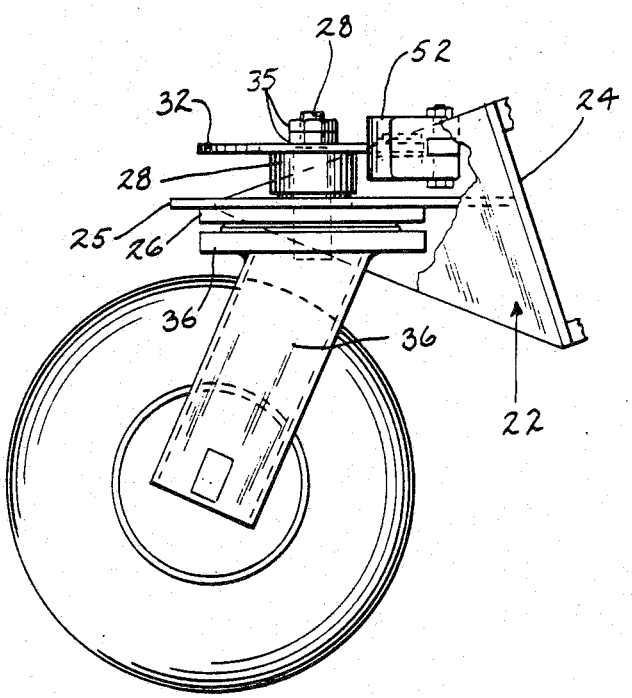
FIG. 3 is a side view partially broken away and partially in section of the caster wheel assembly of FIG. 2.

Referring now to FIG. 7, a pulse-generating wheel 56 is mounted on the drive shaft 57 of the truck 16. The pulse-generating wheel 56 is made of a ferro-magnetic material and includes several equally-spaced holes 58 located a fixed radial distance from its center. In this particular case, because the truck 16 has a two-speed rear axle, the pulse-generating wheel 56 also includes a second group of equally-spaced holes 60 located a second radial distance from the center of the pulse-generating wheel 56. First and second magnetic pickups 62, 64 are mounted on the truck 16 in order to read the pulses created by the first and second sets of holes 58, 60, respectively, as the pulse wheel rotates. A high-low range selector switch 66 can be actuated by the operator of the vehicle so as to determine which of the magnetic pickups 62, 64 is in use. Together, the pulse wheel 56 and magnetic pickups 62, 64 serve as a speed sensor. The signal which is provided by the magnetic pickup 62 or 64 is transmitted to a frequency adjustable speed switch 68, which is a programmable component available in the marketplace, such as the Model 600J speed switch manufactured by Dixson Corporation, which is a magnetic sensor-driven model. The speed switch 68 counts the pulses sent by the magnetic pickup 62 or 64 and compares them to a preset or preprogrammed frequency.

If the frequency of the pulses received from the magnetic pickup is below the preset frequency, no signal is sent to the hydraulic valves which control the operation of the brake pads 54, as will be described in more detail later. When the frequency of the pulses exceeds the pre-programmed frequency, the speed switch 68 completes a circuit and sends a signal to the solenoids 85, 87 that operate the hydraulic valves 82, 84, respectively, which control the operation of the brake, and a preset pressure is applied to the brake, as will be described in more detail later. An on-off switch 70 is provided to turn the system on and off. A push button switch 72 is provided to bypass the speed switch 68 so that an operator can test the hydraulic system without having to operate the vehicle above the preset speed. A pilot lamp 74 is provided so that the operator can tell visually whether the signal is being sent to engage the brake. The electrical controls shown in FIG. 7 and the hydraulic controls shown in FIG. 6 together serve as an actuator or controller assembly for controlling the braking force.

Figure 6:
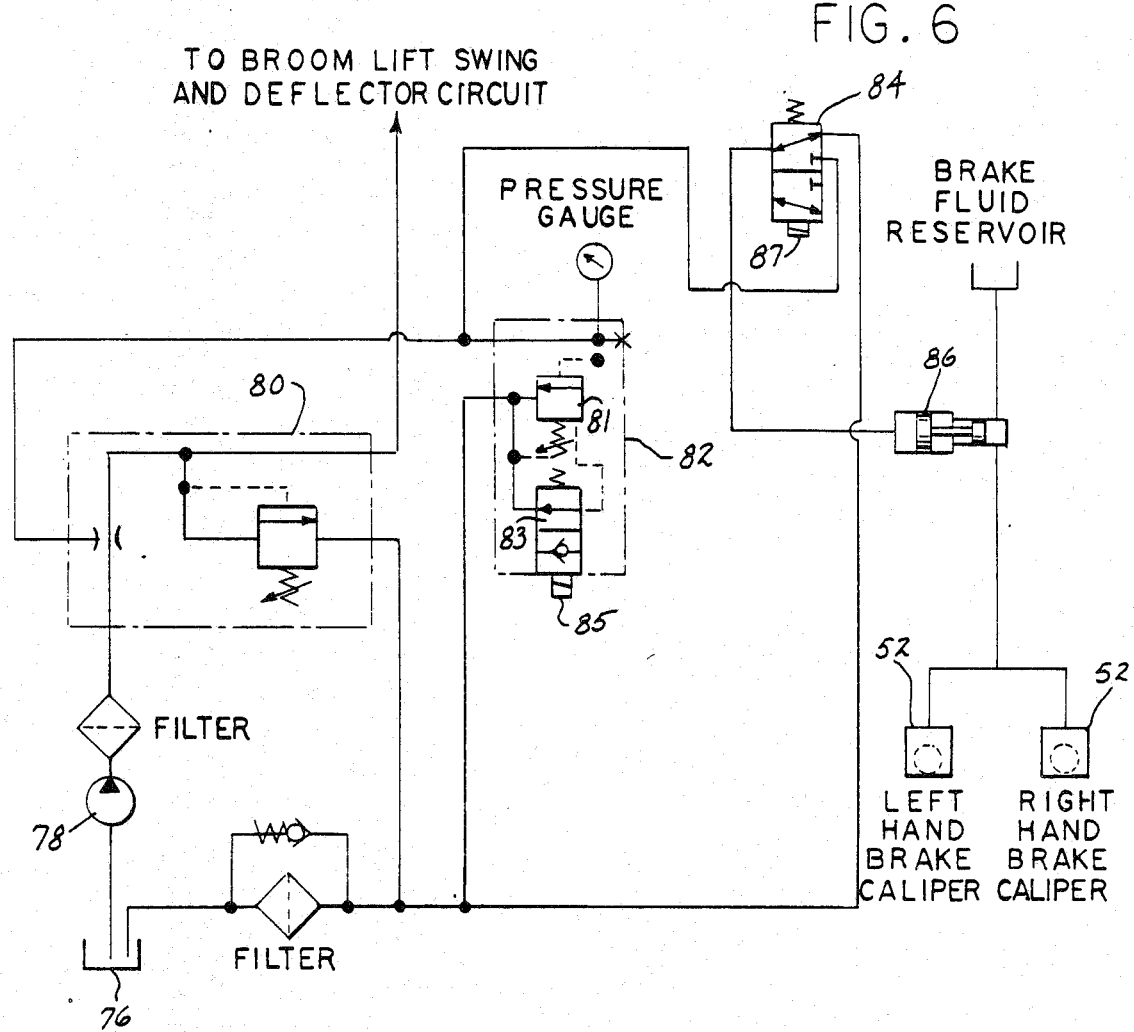
FIG. 6 is a schematic diagram showing the hydraulic control system for the caster wheel assembly of FIG. 2.
Figure 4:
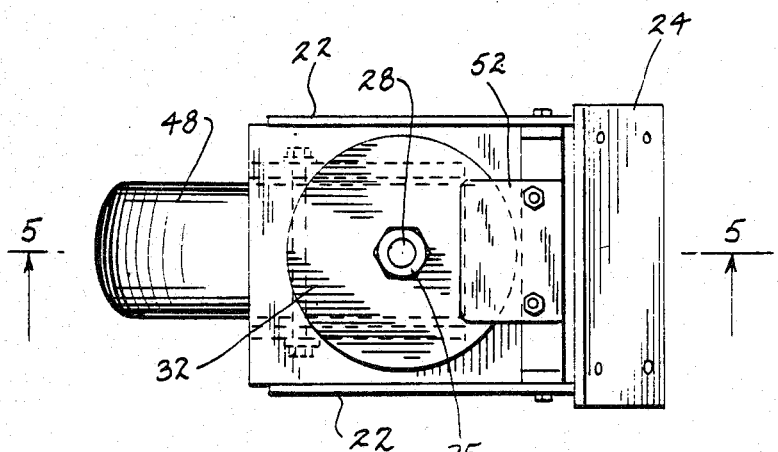
FIG. 4 is a top view of the caster wheel assembly of FIG. 3.
Figure 5:
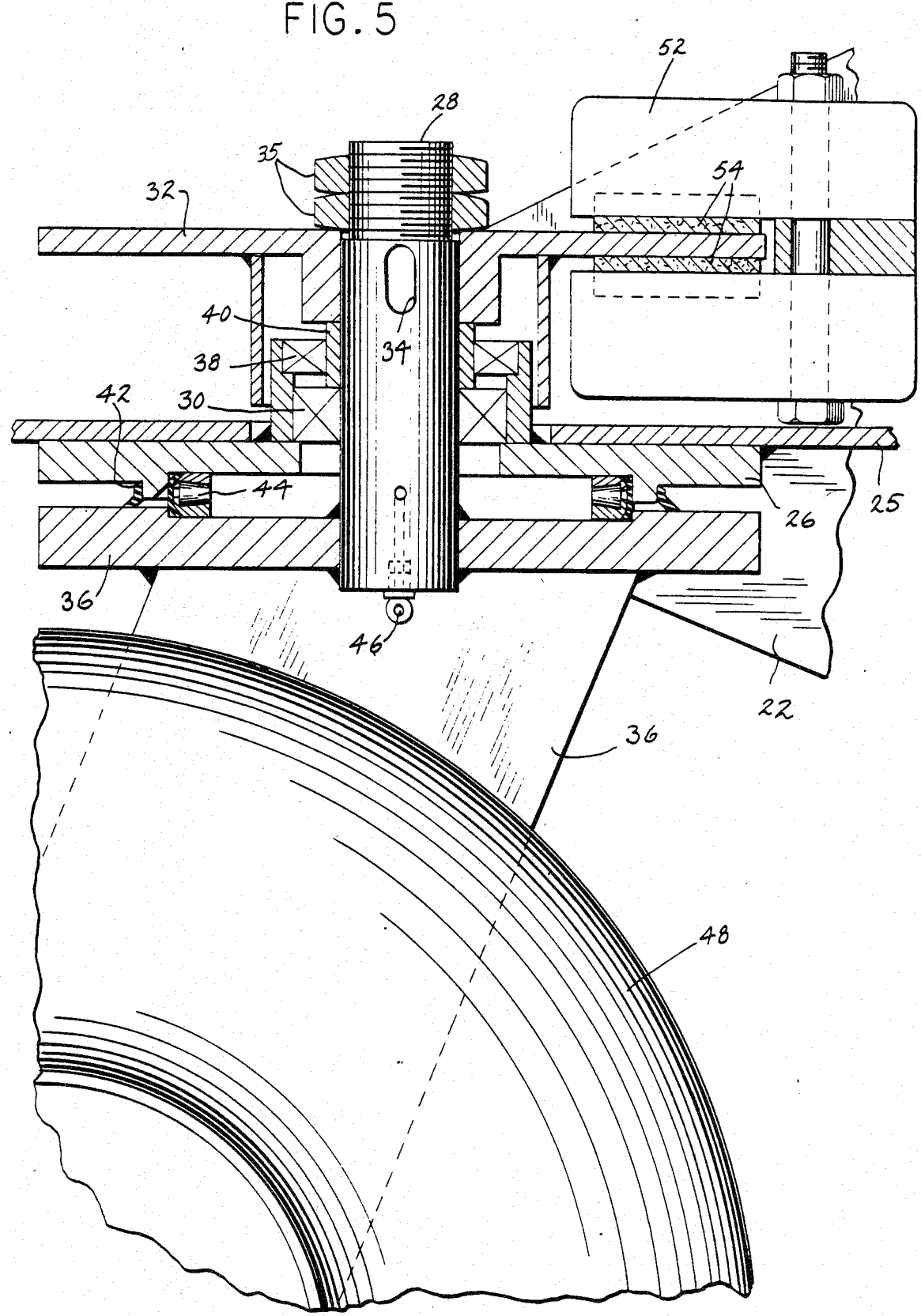
FIG. 5 is an enlarged broken away sectional view taken along the Section 5—5 of FIG. 4.

Turning now to FIG. 6 showing the hydraulic control system, it can be seen that there is a hydraulic fluid reservoir 76 from which hydraulic fluid is pumped by means of a pump 78. A flow divider 80 divides the flow of the pressurized hydraulic fluid, sending some to the broom controls which raise and lower the broom and cause the broom to rotate, and sending the remainder into the system for controlling the brake caliper 52. Since there are two caster wheel assemblies on the sweeper 12, there are two brake calipers 52 which are being controlled.

The fluid for the brakes then goes to a solenoid operated vented relief valve 82 which includes an adjustable valve 81 and a two-position valve 83, which, when not actuated, simply allows fluid to flow through, and, when actuated, puts a check valve in the line. The adjustable valve 81 can be adjusted by the operator in order to set the amount of pressure which will be applied to the brakes. When the two-position check valve 83 is not actuated, the fluid flows through the relief valve 82 and back to the reservoir 76, so there is no back pressure provided by the vented relief valve 82. However, when the two-position check valve 83 is actuated by the solenoid 85, there is a fixed back pressure in the line which depends upon the adjustment of the adjustable valve 81.

The hydraulic fluid then flows to the solenoid operated three-way valve 84, which has two positions. Its first position, which is shown in FIG. 6, is the position the valve 84 takes when it is not electrically actuated. In this position, the pressurized fluid does not pass beyond the three-way valve 84, and the fluid in the brake calipers 52 is vented to the hydraulic reservoir 76, so that no pressure is applied to the brakes. When the speed switch 68 (shown in FIG. 7) activates the solenoid 87, it moves the three-way valve 84 to its second position, in which the pressurized fluid flows through the valve 84, and the port to the hydraulic fluid reservoir 76 is closed. When the three-way valve 84 is in its second or activated position, the pressurized fluid flows through the valve 84 and on to the two-fluid pressure intensifier 86 which multiplies the pressure acting on the brake calipers 52 by a factor of 5 and causes the brake calipers 52 to apply a braking force to the rotor 32 in order to stop shimmying of the caster wheel 48.

When the caster assembly and control system are first installed on a new sweeper assembly or other vehicle, the operator tests the assembly to see how much pressure is required to be applied to the brake calipers 52 in order to stop the shimmying. Once that pressure is determined, the adjustable valve 81 in the solenoid operated vented relief valve 82 is set so as to provide that pressure to the brakes. It also must be determined at what speed the shimmying begins, and that frequency is programmed into the speed switch 68 as the predetermined speed at which the brakes are to be activated. Then, when the sweeper 12 is driven by the truck 16, no frictional force is applied to the brakes until the truck reaches the preset speed. At that point, the speed switch 68 activates the system so that a fixed pressure is applied to the brake calipers 52.

It has been found through testing that the necessary pressure to prevent shimmying is not so great that it prevents the kingpin from rotating (or castering). The pressure at the adjustable valve 81 need only be from 10 to 20 psig in many applications. Therefore, the broom may be operated at high speeds and may still be steered around corners, etc. Because the caster wheel mounting member 36 has the capability for full 360° rotation, the truck may even reverse direction, and the caster wheel 48 will caster properly to permit the reversal of direction. The system thereby prevents shimmying while maintaining maximum maneuverability at all operating speeds.

It will be obvious to those skilled in the art that the caster wheel assembly could be used on other vehicles in addition to the sweeper described herein and that modifications may be made to the embodiment described above without departing from the scope of the present invention.

I claim:

1. A caster wheel assembly for preventing shimmying, comprising:
    a support;
    a caster wheel mounting member rotatably mounted on said support so as to rotate about a substantially vertical axis;
    a caster wheel mounted on said caster wheel mounting member so as to freely rotate about its own substantially horizontal axis;
    a brake, including
        A. a rotating brake member, which is fixed with respect to said caster wheel mounting member so it rotates with said caster wheel mounting member, and
        B. a stationary brake member; and
    a controller assembly for operating said brake in order to prevent shimmying of said caster wheel by limiting rotation of said caster wheel mounting member about its substantially vertical axis, including a speed sensor for sensing the speed of the vertical on which the caster wheel assembly is to be mounted; and
    an actuator, which, when the speed of the vehicle is below a preset speed, provides that no braking force is applied to said brake, and, when the speed of the vehicle exceeds a preset speed, applies a predetermined force to said brake.

2. A caster wheel assembly as recited in claim 1, wherein said predetermined braking force is high enough to prevent shimmying but low enough to permit said caster wheel mounting member to continue to rotate about its axis for castering.

3. A caster wheel assembly as recited in claim 2, wherein said rotating brake member is a brake rotor fixed with respect to said caster wheel mounting member and wherein said stationary brake member includes a pair of brake pads and a brake caliper.

4. A caster wheel assembly as recited in claim 1, wherein said controller assembly comprises:
    a pump for pumping hydraulic fluid;
    an adjustable valve which can be adjusted by an operator to vary the pressure applied to said brake;
    a control valve, which, in a first position, applies no pressure to said brake, and, in a second position, applies pressure to said brake;
    a pulse-generating device to be mounted on the vehicle;
    a pick-up device for receiving pulses from said pulse-generating device;
    a speed switch which counts the pulses received by said pick-up device, and, if the pulses are below a preset frequency, causes said control valve to move to its first position, and, if the pulses are above the present frequency, causes said control valve to move to its second position, so as to activate said brake.

5. A caster wheel assembly, comprising:
    a support;
    a caster kingpin rotatably mounted on said support;
    a caster wheel mounting member fixed to said caster kingpin so as to rotate with said caster kingpin;
    a caster wheel mounted on said caster wheel mounting member so as to freely rotate about its own axis;
    a brake, including
        A. a rotating brake member, which is fixed with respect to said caster kingpin so as to rotate with said caster kingpin; and
        B. a stationary brake member;
    a controller assembly for operating said brake, including a speed sensor for sensing the speed of the vehicle on which the caster wheel assembly is to be mounted; and
    an actuator, which, when the speed of the vehicle is below a preset speed, provides that no braking force is applied to said brake, and, when the speed of the vehicle exceeds a preset speed, applies a predetermined force to said brake.

6. A caster wheel assembly as recited in claim 5, wherein said rotating brake member is a brake rotor, and said stationary brake member is a brake caliper including brake pads, said brake caliper being fixed to said support.

* * * * *

UNITED STATES PATENT AND TRADEMARK OFFICE
CERTIFICATE OF CORRECTION

PATENT NO. : 4,667,365

DATED : 5/26/87

INVENTOR(S) : Norman A. Martinek

It is certified that error appears in the above-identified patent and that said Letters Patent is hereby corrected as shown below:

In the Title, "Verticle" should be --Vertical--.

Column 5, line 33, (claim 1) "vertical" should be --vehicle--.

Signed and Sealed this

Twenty-second Day of September, 1987

Attest:

DONALD J. QUIGG

Attesting Officer     Commissioner of Patents and Trademarks